(12) United States Patent
Lin et al.

(10) Patent No.: US 11,473,770 B1
(45) Date of Patent: Oct. 18, 2022

(54) COLOR TEMPERATURE ADJUSTABLE AND DIMMABLE MAGNIFIER

(71) Applicant: HWA TANG OPTICAL INDUSTRIES CO., LTD., New Taipei (TW)

(72) Inventors: Yu-Chun Lin, New Taipei (TW); Yuan Lin, New Taipei (TW)

(73) Assignee: HWA TANG OPTICAL INDUSTRIES CO., LTD., New Taipei (TW)

( * ) Notice: Subject to any disclaimer, the term of this patent is extended or adjusted under 35 U.S.C. 154(b) by 0 days.

(21) Appl. No.: 17/547,261

(22) Filed: Dec. 10, 2021

(51) Int. Cl.
| | | |
|---|---|---|
| *F21V 33/00* | (2006.01) | |
| *G02B 7/02* | (2021.01) | |
| *F21V 23/00* | (2015.01) | |
| *F21S 9/02* | (2006.01) | |
| *G02B 25/00* | (2006.01) | |
| *F21Y 113/10* | (2016.01) | |

(52) U.S. Cl.
CPC ............ *F21V 33/0048* (2013.01); *F21S 9/02* (2013.01); *F21V 23/003* (2013.01); *G02B 7/02* (2013.01); *G02B 25/002* (2013.01); *F21Y 2113/10* (2016.08)

(58) Field of Classification Search
CPC ...... F21V 33/0048; F21V 23/003; F21S 9/02; G02B 7/02; G02B 25/002
USPC ....................................................... 362/157
See application file for complete search history.

(56) References Cited

U.S. PATENT DOCUMENTS

| | | | | |
|---|---|---|---|---|
| 6,232,937 | B1* | 5/2001 | Jacobsen ............ | H04M 1/0202 345/95 |
| 9,175,868 | B2* | 11/2015 | Fadell ................. | G01R 31/26 |
| 2003/0133292 | A1* | 7/2003 | Mueller .............. | H05B 45/10 362/231 |
| 2009/0141474 | A1* | 6/2009 | Kolodin .............. | F21V 3/04 362/84 |
| 2014/0265923 | A1* | 9/2014 | Le Toquin ........... | F21K 9/232 315/297 |
| 2015/0091451 | A1* | 4/2015 | Williams ............. | H05B 45/10 315/160 |
| 2018/0020522 | A1* | 1/2018 | Rogers, III .......... | F21K 9/65 |
| 2019/0215927 | A1* | 7/2019 | Sooch ................. | H05B 45/20 |
| 2021/0403213 | A1* | 12/2021 | Song ................... | B65D 51/24 |

* cited by examiner

*Primary Examiner* — Bryon T Gyllstrom

(57) ABSTRACT

A color temperature adjustable and dimmable magnifier comprises: a housing, a magnifying lens, a plural set of light emitting members and a control member, the housing comprises a lens carrier and a grip connecting the lens carrier; the magnifying lens is set in the lens carrier; the plural set of light emitting members are set around the lens carrier, each set of the light emitting member includes a cold light source and a warm light source; and the control member connects each cold light source and each warm light source, the control member controls turning on and off cold light sources and warm light sources according to the external instructions received, and adjusts the brightness of cold light sources and warm light sources to combine into a plural color temperature. The color temperature adjustable and dimmable magnifier can meet the various needs of users for color temperature and brightness.

9 Claims, 3 Drawing Sheets

COLOR TEMPERATURE ADJUSTABLE AND DIMMABLE MAGNIFIER

BACKGROUND OF THE INVENTION

1. Field of the Invention

The present disclosure relates to a magnifier, and in particular to a color temperature adjustable and dimmable magnifier.

2. Description of the Related Art

At present, the light-assisted magnifier on the market can be divided into cold light and warm light according to the loading of different light sources. Depending on the needs, it is necessary to choose a magnifier with different color temperature, which causes inconvenience to use. Moreover, the sensitivity of photosensitive cells in everyone's eyes to cold light and warm light is different, and the cold light (or warm light) suitable for one person may not be comfortable for another person, so the cold light or warm light of a single color temperature or brightness cannot meet the needs of most people.

BRIEF SUMMARY OF THE INVENTION

Therefore, in order to solve the various problems of the traditional magnifier, the disclosure provides a color temperature adjustable and dimmable magnifier.

To achieve the above objective and other objectives, the present disclosure provides a color temperature adjustable and dimmable magnifier, which comprises: a housing, comprising a lens carrier and a grip connected the lens carrier; a magnifying lens, set in the lens carrier; a plural set of light emitting members, set around the lens carrier, each set of the light emitting member includes a cold light source and a warm light source; and a control member, connecting each cold light source and each warm light source by signal, the control member controls turning on and off each cold light source and each warm light source according to an external instructions received, and adjusts the brightness of each cold light source and each warm light source to combine into a plural color temperature.

In an embodiment of the disclosure, the cold light source and the warm light source of each set of the light emitting member are closely adjacent.

In an embodiment of the disclosure, the brightness of each cold light source and each warm light source is changed by six stages or more stages.

In an embodiment of the disclosure, the color temperature of the cold light source is 5200 to 6500 K, the color temperature of the warm light source is 2500 to 3200 K.

In an embodiment of the disclosure, the cold light source is a LED of cold light, the warm light source is a LED of warm light.

In an embodiment of the disclosure, the warm light source comprises a warm color lampshade and a white light LED, the warm color lampshade covers over the white light LED.

In an embodiment of the disclosure, each set of the light emitting member is turned on continuously for a certain period of time, and the control member automatically controls turning off each set of the light emitting member.

In an embodiment of the disclosure, the color temperature adjustable and dimmable magnifier further comprises a battery module and an external power supply interface, the battery module and the external power supply interface independently electrically connect to the control member.

In an embodiment of the disclosure, one end of the grip is set with a screw hole that is in the reverse direction of the lens carrier.

Therefore, the color temperature adjustable and dimmable magnifier of the disclosure can combine into a plural mixed color temperature, in order to meet the needs of users, and not just a dichotomy of the cold light or the warm light to be chosen from.

DETAILED DESCRIPTION OF THE INVENTION

Figure 1:
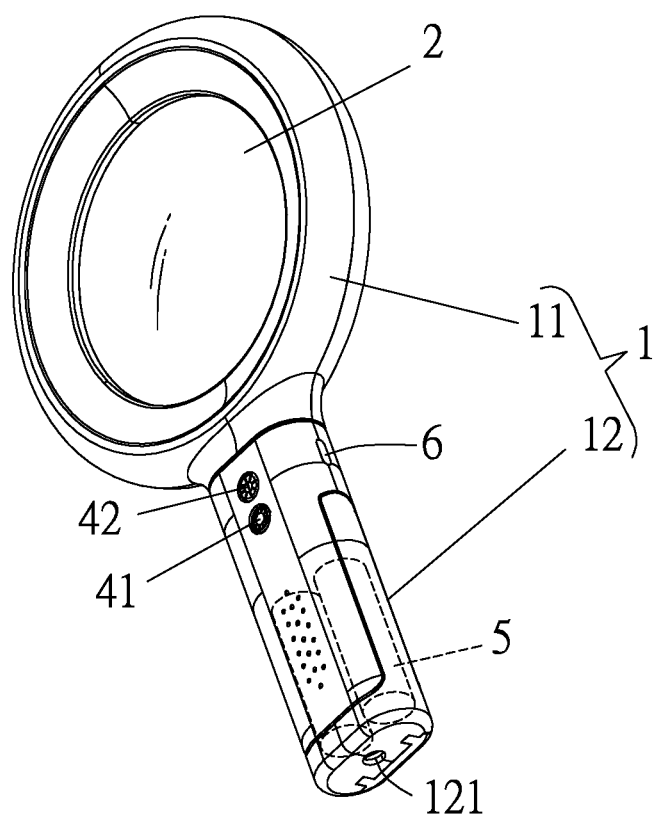
FIG. 1 is a schematic perspective view of a color temperature adjustable and dimmable magnifier according to an embodiment of the present disclosure.
Figure 2:
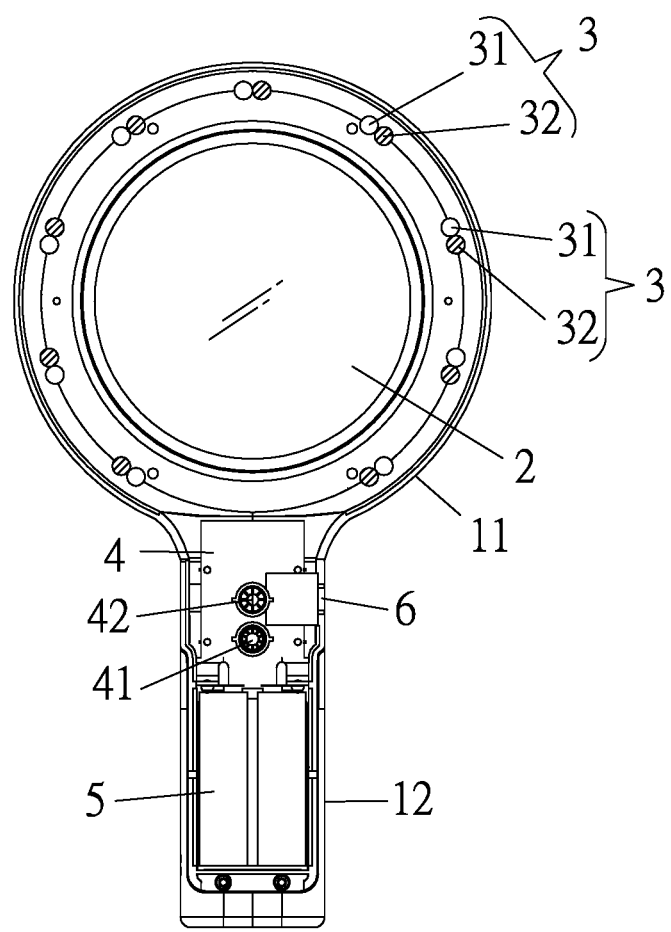
FIG. 2 is a schematic view showing the internal structure of the color temperature adjustable and dimmable magnifier according to the embodiment of the present disclosure.

To facilitate understanding of the present disclosure, embodiments together with the attached drawings for the detailed description of the present disclosure are provided. One skilled in the art can understand the object, characteristics and effects of this present disclosure by the content described in the specification. It should be noted that various possible modifications and alterations to the details of the specification could be carried out by implementing or applying other different embodiments based on different views and applications without departing from the spirit of the present disclosure. The related technical contents of the disclosure will be described in detail by the embodiments. However, the disclosed contents should not be considered to limit the scope of the disclosure. The description is provided as follows:

As shown in FIGS. 1 and 2, a color temperature adjustable and dimmable magnifier 100 of an embodiment of the disclosure comprises: a housing 1, a magnifying lens 2, a plural set of light emitting members 3 and a control member 4.

The housing 1 comprises a lens carrier 11 and a grip 12 connected the lens carrier 11. Preferably, the housing 1 is a plastic piece formed by injection molding, having features that it is lightweight, resistant to dirt, resistant to wear and so on. In the embodiment, a diameter of the lens carrier 11 is up to 100 mm, however, the disclosure is not limited to herein, the lens carrier 11 can also be other dimensions.

The magnifying lens 2 is set in the lens carrier 11. In general, the magnifying lens 2 is a convex lens, however, the disclosure is not limited to herein, can be assembled by different types of lenses according to the needs. In the embodiment, the magnifying lens 2 has a diopter up to 8 D, which is a large-size high diopter lens. However, the disclosure is not limited to herein, the magnifying lens 2 may be other specifications.

The plural set of light emitting members 3 are set around the lens carrier 11, each set of the light emitting member 3 includes a cold light source 31 and a warm light source 32. In FIG. 2 of the embodiment, a total of nine sets of light emitting members 3 are set up, arranged around each other equidistantly, however, the disclosure is not limited to herein, the number of light emitting members 3 and a configuration method thereof may be changed. The cold light source 31, for example, is white light, blue light and other color light, and the warm light source 32, for example, is red light, orange light or yellow light and other color light, in which the former is more suitable for inspection, distinguishing products, and the latter is more suitable for long hours reading. The cold light has a higher color temperature, such as 5200 to 6500 K, while the warm light has a lower color temperature, such as 2500 to 3200 K. In the embodiment, the cold light source 31 is a light-emitting diode (LED) of cold light, the warm light source 32 is a LED of warm light, however, the disclosure is not limited to herein, the basic color light of the cold light source 31 and the warm light source 32 and the type of light source can be changed according to the needs.

The control member 4 connects each cold light source 31 and each warm light source 32 by signal. The control member 4 controls turning on and off each cold light source 31 and each warm light source 32 according to an external instructions received, and adjusts the brightness of each cold light source 31 and each warm light source 32 to combine into a plural color temperature.

In detail, the control member 4, for example, has a brightness adjusting piece 41 and a color temperature adjusting piece 42. The brightness adjusting piece 41 and the color temperature adjusting piece 42 are preferably exposed on the grip 12. By triggering the brightness adjusting piece 41, the control member 4 adjusts the overall brightness of the light emitting member 3 stage by stage. For example, the brightness adjusting piece 41 is pressed by the first time, the control member 4 controls the overall brightness of the light emitting member 3 to be 20% brightness that is the dimmest, and then pressed once again, the overall brightness is increased to 40% brightness, and the rest may be increased by analogy, pressed by the fifth time, the overall brightness is increased to 100% brightness that is brightest, and pressed by the sixth time, the control member 4 controls the light emitting member 3 to be off. In the embodiment, the brightness of each cold light source 31 and each warm light source 32 is changed by six stages (including off that is no brightness). However, the disclosure is not limited to herein, the brightness stages of each cold light source 31 and each warm light source 32 may be simply changed.

On the other hand, the control member 4 can also change the color temperature according to the external instructions received. In detail, by triggering the color temperature adjusting piece 42, the control member 4 adjusts turning on and off as well as turning up and down the cold light source 31 and the warm light source 32 of each set of light emitting member 3 to combine into a plural color temperature. For example, in an example, the color temperature adjusting piece 42 is for three-stage color temperature adjustment, the color temperature adjusting piece 42 is pressed by the first time, the control member 4 only allows the cold light source 31 to be turned on, and then pressed by the second time, the control member 4 allows the cold light source 31 and the warm light source 32 to be simultaneously turned on, so as to combine into color temperature therebetween, pressed by the third time, the control member 4 only allows the warm light source 32 to be turned on and the cold light source 31 to be turned off to obtain color temperature of a pure warm light source. Further, with regard to the control member 4 allowing the cold light source 31 and the warm light source 32 to be simultaneously turned on, more stages of changes may also be generated to combine into more combinations of color temperature. For example, the control member 4 may make the cool light source 31 have the brightness of 80% and the warm light source 32 have the brightness of 20%, so as to bring out a mixed color temperature tending to the cool light; the color temperature adjusting piece 42 is pressed once again, the control member 4 allows the cold light source 31 to have the brightness of 20% and the warm light source 32 to have the brightness of 80%, so as to bring out a mixed color temperature tending to the warm light, in this example, that is the four-stage color temperature adjustment (pure cold light, two mixed color light, pure warm light). The more sophisticated the control member 4 controls the brightness of the cold light source 31 and the warm light source 32, the more varied the mixed color temperature may be combined, in order to meet the needs of users, and not just a dichotomy of the cold light or the warm light to be chosen from.

Further, in the embodiment, as shown in FIG. 2, each set of the light emitting member 3 is separated with a certain distance, but the cold light source 31 and the warm light source 32 belonging to each set of the light emitting member 3 are closely adjacent to preferably form a mixed color temperature. However, the disclosure is not limited to herein, the cold light source 31 and the warm light source 32 belonging to each set of the light emitting member 3 may also be far apart from each other or equidistant distribution, or all the light emitting members 3 are closely adjacent to each other.

Figure 3:
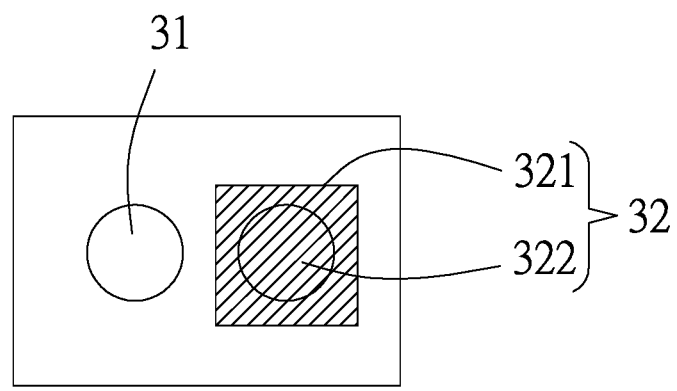
FIG. 3 is a schematic view of the light emitting member according to another embodiment of the present disclosure.

In the embodiment, the cold light source 31 is a LED of white light, the warm light source 32 is a LED of the warm light, the two are different materials; however, in another embodiment, as shown in FIG. 3, the warm light source 32 of the light emitting member 3*a* comprises a warm color lampshade 321 and a white light LED 322, that is, the LED used by the two is the same white lamp material, and then the warm color lampshade 321 is used to cover over one of the white light LEDs to produce warm light. The advantage of this approach is that the same LED can only be used, but the disadvantage is that the assembly is difficult. A second lampshade can also be provided, covering the cold light source 31 and the warm light source 32 to make the mixed light more uniform.

Further, in the embodiment, each set of the light emitting member 3 is turned on continuously for a certain period of time, and the control member 4 automatically controls turning off each set of the light emitting member 3. In the embodiment, a forced power off after 30 minutes is required to avoid wasted electricity by accidental touch or forgetting to turn off, but the disclosure is not limited to herein.

Further, in the embodiment, as shown in FIG. 2, the color temperature adjustable and dimmable magnifier 100 further comprises: a battery module 5 and an external power supply interface 6. The battery module 5, for example, is a battery slot electrically connecting a plural set of the light emitting members 3 to provide power to the light emitting members 3. The external power supply interface 6, for example, is a charging interface of type C or a charging interface of Universal Serial Bus (USB), which uses an external power supply to provide power to the light emitting members 3 directly. Also, the battery module 5 and the external power supply interface 6 independently electrically connect to the control member 4, that is, the external power supply interface 6 does not charge the battery module 5, in order to prevent a rechargeable battery from occurring overcharge, or prevent the external power supply interface 6 from electrically connecting to a disposable battery and create a danger of use.

Further, in the embodiment, as shown in FIG. 1, one end of the grip 12 is set with a screw hole 121 that is in the reverse direction of the lens carrier 11. The screw hole 121 can be used to connect other devices and makes it easier to use the magnifier, for example, connect to other jigs.

Further, in the embodiment, the color temperature adjustable and dimmable magnifier may further have a light guiding member (not shown in figures), which is set around the lens carrier 11 and covers over each set of the light emitting member 3, the light guiding member can make a point light source become more uniform by multiple refraction, so that each set of the light emitting member 3 emits soft light.

While the present disclosure has been described by means of specific embodiments, those skilled in the art should understand the above description is merely embodiments of the disclosure, and it should not be considered to limit the scope of the disclosure. It should be noted that all changes and substitutions which come within the meaning and range of equivalency of the embodiments are intended to be embraced in the scope of the disclosure. Therefore, the scope of the disclosure is defined by the claims.

What is claimed is:

1. A color temperature adjustable and dimmable handheld magnifier, comprising:
    a housing, comprising a lens carrier and a grip connected the lens carrier;
    a magnifying lens, set in the lens carrier;
    a plural set of light emitting members, disposed at the lens carrier and set around the magnifying lens, each set of the light emitting member includes a cold light source and a warm light source; and
    a control member, connecting each cold light source and each warm light source by signal, the control member controls turning on and off each cold light source and each warm light source according to an external instructions received, and adjusts the brightness of each cold light source and each warm light source to combine into a plural color temperature.

2. The color temperature adjustable and dimmable handheld magnifier according to claim 1, wherein the cold light source and the warm light source of each set of the light emitting member are closely adjacent.

3. The color temperature adjustable and dimmable handheld magnifier according to claim 1, wherein the brightness of each cold light source and each warm light source is changed by six stages.

4. The color temperature adjustable and dimmable handheld magnifier according to claim 1, wherein the color temperature of the cold light source is 5200 to 6500 K, the color temperature of the warm light source is 2500 to 3200 K.

5. The color temperature adjustable and dimmable handheld magnifier according to claim 1, wherein the cold light source is a LED of cold light, the warm light source is a LED of warm light.

6. The color temperature adjustable and dimmable handheld magnifier according to claim 1, wherein the warm light source comprises a warm color lampshade and a white light LED, the warm color lampshade covers over the white light LED.

7. The color temperature adjustable and dimmable handheld magnifier according to claim 1, wherein each set of the light emitting member is turned on continuously for a certain period of time, and the control member automatically controls turning off each set of the light emitting member.

8. The color temperature adjustable and dimmable handheld magnifier according to claim 1, further comprising a battery module and an external power supply interface, the battery module and the external power supply interface independently electrically connect to the control member.

9. The color temperature adjustable and dimmable handheld magnifier according to claim 1, wherein one end of the grip is set with a screw hole that is in the reverse direction of the lens carrier.

* * * * *